(12) United States Patent
Yenganti et al.

(10) Patent No.: US 9,247,476 B2
(45) Date of Patent: Jan. 26, 2016

(54) SYSTEMS AND METHODS FOR COORDINATING POWER MANAGEMENT IN AN INDEPENDENT BASIC SERVICE SET

(71) Applicant: QUALCOMM Incorporated, San Diego, CA (US)

(72) Inventors: Pradeep Kumar Yenganti, Sunnyvale, CA (US); Rahul Jammula, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 143 days.

(21) Appl. No.: 14/017,956

(22) Filed: Sep. 4, 2013

(65) Prior Publication Data

US 2015/0016322 A1    Jan. 15, 2015

Related U.S. Application Data

(60) Provisional application No. 61/844,821, filed on Jul. 10, 2013.

(51) Int. Cl.
*H04W 4/00* (2009.01)
*H04W 40/00* (2009.01)
*H04W 52/02* (2009.01)

(52) U.S. Cl.
CPC ........ *H04W 40/005* (2013.01); *H04W 52/0216* (2013.01)

(58) Field of Classification Search
CPC .................. H04W 40/005; H04W 52/0216

USPC .................................................. 370/311, 338
See application file for complete search history.

(56) References Cited

U.S. PATENT DOCUMENTS

| | | | |
|---|---|---|---|
| 7,412,265 B2 | 8/2008 | Chen et al. | |
| 7,430,421 B2* | 9/2008 | Park | 455/456.1 |
| 7,526,288 B2* | 4/2009 | Eom et al. | 455/435.1 |
| 7,656,831 B2 | 2/2010 | Gao et al. | |
| 7,817,961 B2 | 10/2010 | Sinivaara et al. | |
| 8,374,192 B2 | 2/2013 | Surineni et al. | |
| 8,625,571 B2* | 1/2014 | Sakoda | 370/350 |
| 2005/0128990 A1* | 6/2005 | Eom et al. | 370/338 |
| 2005/0197171 A1* | 9/2005 | Son et al. | 455/574 |
| 2006/0193296 A1 | 8/2006 | Zhong et al. | |
| 2007/0207765 A1* | 9/2007 | Nakahara et al. | 455/343.1 |
| 2011/0158142 A1* | 6/2011 | Gong et al. | 370/311 |
| 2012/0100881 A1* | 4/2012 | Son et al. | 455/521 |

\* cited by examiner

*Primary Examiner* — Steven H Nguyen
(74) *Attorney, Agent, or Firm* — Bay Area Technology Law Group PC (57) ABSTRACT

Systems and methods are provided for coordinating power management for wireless communications devices in an independent basic service set (IBSS). An announcement traffic indication message (ATIM) coordinator receives address information for destination stations for which data is buffered for transmission at source stations. The ATIM coordinator sends an ATIM Indication frame at the end of an ATIM window, alerting any destination station to remain awake to receive buffered data. Source stations may enter power save mode during the ATIM window after transmitting the address information for the destination stations to the ATIM coordinator. Destination stations may enter power save mode after receiving a beacon at the start of the ATIM window. Source and destination stations may awaken at the end of the ATIM window to receive the ATIM Indication frame.

21 Claims, 8 Drawing Sheets

SYSTEMS AND METHODS FOR COORDINATING POWER MANAGEMENT IN AN INDEPENDENT BASIC SERVICE SET

RELATED APPLICATIONS

This application claims priority from U.S. Provisional Patent Application Ser. No. 61/844,821, filed Jul. 10, 2013.

FIELD OF THE PRESENT DISCLOSURE

This disclosure generally relates to wireless communication systems and more specifically to systems and methods for implementing power saving techniques in an ad hoc network.

BACKGROUND

Wireless local area networks (WLANs) conforming to specifications in the Institute of Electrical and Electronics Engineers ("IEEE") 802.11 family typically involve an infrastructure-based network topology such as a basic service set (BSS) or an ad hoc-based network topology such as an independent basic service set (IBSS). While a BSS may be managed by a device acting in the role of an access point (AP), management functions in an IBSS are distributed among the participating devices. One important area associated with network management is the implementation of power management techniques that allow a device to enter a power save mode of operation, during which it may be able to conserve battery resources, but may not be able to receive or transmit communications. Such techniques may be more challenging in an ad hoc network due to the lack of a dedicated management device, such as the AP.

To that end, power management for stations operating in an IBSS may be coordinated through the use of announcement traffic indication messages (ATIMs) that are exchanged during a defined period of time known as the ATIM window that immediately follows the target beacon transmission time (TBTT). Conventionally, all stations in the IBSS awaken prior to the TBTT in order to receive the beacon transmission and stay awake at least for the duration of the ATIM window. Accordingly, a station may send an ATIM frame within the ATIM window to indicate the presence of buffered data that is pending transmission to one or more other stations. Upon receipt of an ATIM frame identifying it, a station may then remain in active mode through the current beacon interval in order to receive the buffered data. Likewise, the station having buffered data also remains in active mode to transmit the data during the current beacon interval.

As will be appreciated, this conventional scheme results in all stations in the IBSS remaining in active mode for the duration of the ATIM window. Further, any station that will be transmitting or receiving buffered data remains in active mode for the current beacon interval and at least the subsequent ATIM window. Thus, considerable power is expended by the stations in order to operate in active mode for the ATIM windows and additional power may be consumed when buffered data is to be exchanged.

Accordingly, it would be desirable to provide systems and methods for coordinating power management among devices in an IBSS that allow a reduction in power consumption while coordinating the exchange of buffered data. This disclosure addresses these and other needs.

SUMMARY

This disclosure includes methods for coordinating power management for a plurality of stations in an independent basic service set (IBSS). For example, one method may include broadcasting a beacon frame by an announcement traffic indication message (ATIM) coordinator at a beginning of an ATIM window, wherein the ATIM coordinator is a station within the IBSS, receiving at the ATIM coordinator a first ATIM Request frame from a first source station within the IBSS having buffered data pending transmission for a first destination station within the IBSS during the ATIM window, wherein the first ATIM Request frame includes location information for the first destination station, collecting the location information for the first destination station from the received first ATIM Request frame, and broadcasting by the ATIM coordinator an ATIM Indication frame at an end of the ATIM window, wherein the ATIM Indication frame includes the collected location information. Further, the ATIM coordinator may receive a second ATIM Request frame from a second source station within the IBSS having buffered data pending transmission for a second destination station within the IBSS during the ATIM window, wherein the second ATIM Request frame includes location information for the second destination station and may collect the location information for the second destination station from the received second ATIM Request frame, wherein the ATIM Indication frame includes the collected location information for the second destination station. The location information for the first destination station may be an address and the location information for the second destination station may be an address. Additionally, an address of a second destination station for which the ATIM coordinator has buffered data pending transmission may be added to the collected location information. Still further, the ATIM coordinator may receive an ATIM Request frame from the first source station before the first source station enters a power save mode.

In one aspect, a method for operating a station in an IBSS for a plurality of stations may include receiving at a first station a beacon frame broadcast by an ATIM coordinator at a beginning of an ATIM window, wherein the ATIM coordinator is a station within the IBSS, operating the first station in a power save mode for a period of time after receiving the beacon frame, operating the first station in an active mode after an end of the ATIM window, and receiving at the first station an ATIM Indication frame transmitted by the ATIM coordinator after the end of the ATIM window. Further, an ATIM Request frame may be transmitted by the first station when the first station is a source station having buffered data pending transmission for a destination station within the IBSS, wherein the ATIM Request frame is transmitted after the first station has received the beacon frame and before operating the first station in the power save mode and wherein the ATIM Request frame has location information identifying the destination station. In addition, the first station may be operated in an active mode after receiving the ATIM Indication frame and transmitting the buffered data to the destination station. The first station may also transmit the buffered data to the destination station after receiving an ATIM Response frame transmitted by the destination station.

In one aspect, the first station may be operated in an active mode after receiving the ATIM Indication frame when the first station is identified as a destination station by the ATIM Indication frame. Further, an ATIM Response frame may be transmitted by the first station to a source station identified by the ATIM Indication frame to initiate transfer of buffered data pending transmission from the source station to the first station.

In one aspect, the first station may be operated in the power save mode for a current beacon interval after receiving the ATIM Indication frame when the ATIM Indication frame does not identify the first station as a destination station for buffered data pending transmission.

This disclosure also includes a wireless communications device for use in an IBSS with a plurality of stations. The device may have a transceiver and an ATIM controller, wherein the transceiver is configured to broadcast a beacon frame at a beginning of an ATIM window, receive a first ATIM Request frame from a first source station within the IBSS having buffered data pending transmission for a first destination station within the IBSS during the ATIM window, wherein the first ATIM Request frame includes location information for the first destination station, and broadcast an ATIM Indication frame at an end of the ATIM window; and wherein the ATIM controller is configured to collect the location information for the first destination station from the received first ATIM Request frame and provide the collected location information to the transceiver to be transmitted in the ATIM Indication frame. The transceiver may also receive a second ATIM Request frame from a second source station within the IBSS having buffered data pending transmission for a second destination station within the IBSS during the ATIM window, wherein the second ATIM Request frame includes location information for the second destination station such that the ATIM controller may collect the location information for the second destination station from the received second ATIM Request frame and provide the collected location information for the second destination station to the transceiver to be transmitted in the ATIM Indication frame. Further, the location information for the first destination station may be an address and the location information for the second destination station may be an address. Still further, the ATIM controller may add an address of a second destination station for which the wireless communications device has buffered data pending transmission to the collected location information.

A wireless communications device according to this disclosure may also have transceiver and an ATIM controller, wherein the transceiver may be configured to receive a beacon frame broadcast by an ATIM coordinator at a beginning of an ATIM window, wherein the ATIM coordinator is a station within the IBSS, and to receive an ATIM Indication frame transmitted by the ATIM coordinator after an end of the ATIM window such that the ATIM controller may operate the wireless communications device in a power save mode for a period of time after receiving the beacon frame and may operate the wireless communications device in an active mode after the end of the ATIM window. The ATIM controller may also provide location information to the transceiver for a destination station within the IBSS when the wireless communications device is a source station having buffered data pending transmission for the destination station and the transceiver may transmit an ATIM Request frame having the location information after the wireless communications device has received the beacon frame and before the wireless communications device is operated in the power save mode. Further, the ATIM controller may operate the first station in an active mode after the transceiver receives the ATIM Indication frame and the transceiver may transmit the buffered data to the destination station. In addition, the transceiver may transmit the buffered data to the destination station after receiving an ATIM Response frame transmitted by the destination station.

In one aspect, the ATIM controller may operate the wireless communications device in an active mode after the transceiver receives the ATIM Indication frame when the wireless communications device is identified as a destination station by the ATIM Indication frame. The transceiver may also transmit an ATIM Response frame to a source station identified by the ATIM Indication frame to initiate transfer of buffered data pending transmission from the source station.

In one aspect, the ATIM controller may operate the wireless communications device in the power save mode for a current beacon interval after the transceiver receives the ATIM Indication frame when the ATIM Indication frame does not identify the wireless communications device as a destination station for buffered data pending transmission.

This disclosure also includes a non-transitory processor-readable storage medium for operating a wireless communications device in an IBSS with a plurality of stations, the processor-readable storage medium having instructions thereon, when executed by a processor to cause the wireless communications device to broadcast a beacon frame at a beginning of an ATIM window, collect location information for a first destination station within the IBSS from a first ATIM Request frame transmitted by a first source station within the IBSS having buffered data pending transmission for the first destination station during the ATIM window, and broadcast an ATIM Indication frame at an end of the ATIM window, wherein the ATIM Indication frame includes the collected location information. The storage medium may also include instructions to collect location information for a second destination station within the IBSS from a second ATIM Request frame transmitted by a second source station within the IBSS having buffered data pending transmission for the second destination station during the ATIM window, wherein the ATIM Indication frame includes the collected location information for the second destination station. The location information for the first destination station may be an address and the location information for the second destination station may be an address. Still further, the storage medium may include instructions to add an address of a second destination station for which the wireless communications device has buffered data pending transmission to the collected location information.

In one aspect, a suitable storage medium may include instructions to cause the wireless communications device to operate in a power save mode for a period of time after receiving a beacon frame broadcast by an ATIM coordinator at a beginning of an ATIM window, wherein the ATIM coordinator is a station within the IBSS and to operate in an active mode after an end of the ATIM window to receive an ATIM Indication frame transmitted by the ATIM coordinator after the end of the ATIM window. Further, the storage medium may include instructions to transmit an ATIM Request frame when the wireless communications device is a source station having buffered data pending transmission for a destination station within the IBSS, wherein the ATIM Request frame is transmitted after receiving the beacon frame and before operating in the power save mode and wherein the ATIM Request frame has location information identifying the destination station. Still further, the storage medium may include instructions to operate in an active mode after receiving the ATIM Indication frame and to transmit the buffered data to the destination station. The instructions to transmit the buffered data to the destination station may include instructions to transmit the buffered data after receiving an ATIM Response frame transmitted by the destination station.

In one aspect, the storage medium may include instructions to operate in an active mode after receiving the ATIM Indication frame when the wireless communications device is identified as a destination station by the ATIM Indication frame. Further, the storage medium may include instructions to transmit an ATIM Response frame to a source station identified by the ATIM Indication frame to initiate transfer of buffered data pending transmission from the source station to the wireless communications device.

In one aspect, the storage medium may include instruction to operate in the power save mode for a current beacon interval after receiving the ATIM Indication frame when the ATIM Indication frame does not identify the first station as a destination station for buffered data pending transmission.

BRIEF DESCRIPTION OF THE DRAWINGS

Further features and advantages will become apparent from the following and more particular description of the preferred embodiments of the disclosure, as illustrated in the accompanying drawings, and in which like referenced characters generally refer to the same parts or elements throughout the views, and in which.

DETAILED DESCRIPTION

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present invention and is not intended to represent the only exemplary embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For purposes of convenience and clarity only, directional terms, such as top, bottom, left, right, up, down, over, above, below, beneath, rear, back, and front, may be used with respect to the accompanying drawings or particular embodiments. These and similar directional terms should not be construed to limit the scope of the disclosure in any manner and may change depending upon context. Further, sequential terms such as first and second may be used to distinguish similar elements, but may be used in other orders or may change also depending upon context.

Embodiments are described herein with regard to a wireless communications device, which may include any suitable type of user equipment, such as a system, subscriber unit, subscriber station, mobile station, mobile wireless terminal, mobile device, node, device, remote station, remote terminal, terminal, wireless communication device, wireless communication apparatus, user agent, or other client devices. Further examples of a wireless communications device include mobile devices such as a cellular telephone, cordless telephone, Session Initiation Protocol (SIP) phone, smart phone, wireless local loop (WLL) station, personal digital assistant (PDA), laptop, handheld communication device, handheld computing device, satellite radio, wireless modem card and/or another processing device for communicating over a wireless system. Moreover, embodiments may also be described herein with regard to an access point (AP). An AP may be utilized for communicating with one or more wireless nodes and may be termed also be called and exhibit functionality associated with a base station, node, Node B, evolved NodeB (eNB) or other suitable network entity. An AP communicates over the air-interface with wireless terminals. The communication may take place through one or more sectors. The AP may act as a router between the wireless terminal and the rest of the access network, which may include an Internet Protocol (IP) network, by converting received air-interface frames to IP packets. The AP may also coordinate management of attributes for the air interface, and may also be the gateway between a wired network and the wireless network.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

Figure 1:
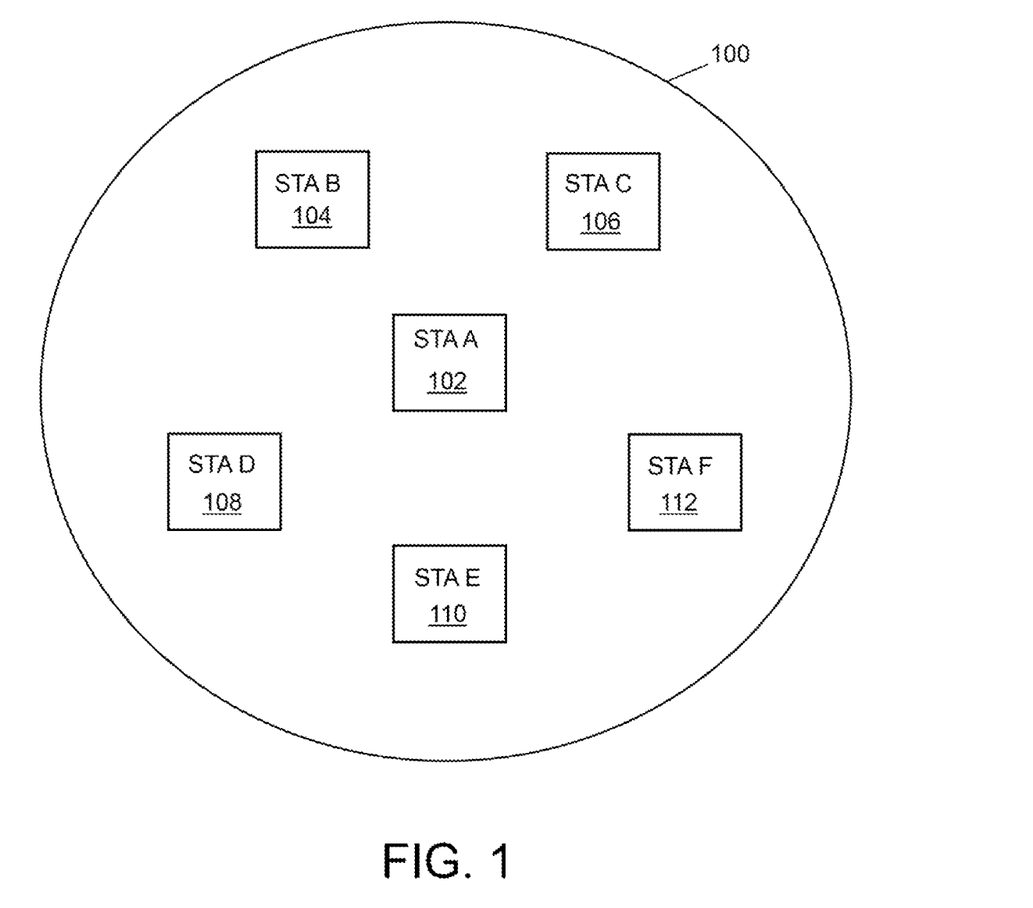
FIG. 1 schematically depicts a representative IBSS WLAN, according to one embodiment.

To help illustrate suitable systems and methods, an exemplary ad hoc WLAN 100 configured as an IBSS under 802.11 standards is depicted in FIG. 1. As shown, WLAN 100 may include a plurality of nodes, such as the wireless communications devices represented as stations (STAs) STA A 102, STA B 104, STA C 106, STA D 108, STA E 110 and STA F 112. As will be described below, some or all of wireless communications devices 102-112 may be configured to enter and exit power save mode, based at least in part on the techniques of this disclosure, which are termed herein "enhanced ATIM coordination." Although shown with six nodes, suitable WLANs may include two or more wireless communications devices configured to implement enhanced ATIM coordination. Examples of devices that may be connected to either WLAN 100 include phones, Personal Digital Assistants (PDAs), computers of various types (laptops, personal computers, workstations, terminals of any type), global positioning system (GPS) devices, video devices such as cameras, camcorders, webcams, and virtually any other type of data device.

Figure 2:
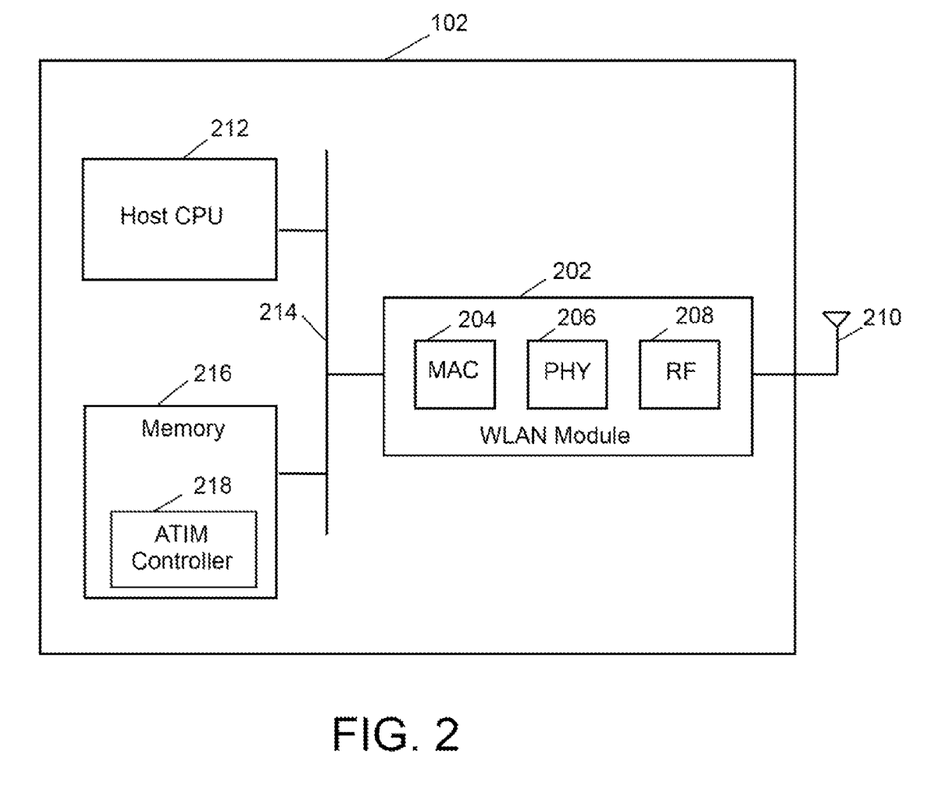
FIG. 2 schematically depicts functional blocks of an enhanced ATIM coordination wireless communications device, according to one embodiment.

Details regarding one embodiment of a wireless communications device 102 having enhanced ATIM coordination capabilities are depicted as high level schematic blocks in FIG. 2. Generally, wireless communications device 102 may employ an architecture in which the lower levels of the WLAN protocol stack are implemented in firmware and hardware modules of WLAN transceiver 202. WLAN module 202 may include media access controller (MAC) 204 that performs functions related to the handling and processing of wireless frames of data (e.g., frames defined in various IEEE 802.11 protocols) including verification, acknowledgment, routing, formatting and the like. Incoming and outgoing frames are exchanged between the MAC 204 and a physical (PHY) layer 206 that modulates the frames. WLAN transceiver 202 may also include a radio frequency (RF) block 208 coupled to antenna 210 to provide the analog processing and RF conversion necessary to enable transmission and reception of wireless signals. Although not shown, RF block 208 may include conventional components such as one or more amplifying stages to amplify a received RF signal, one or more filtering stages to remove unwanted bands of frequencies, mixer stages to down-convert the received RF signal, automatic gain control (AGC) functionality to adjust the gain to an appropriate level for a range of received signal amplitude levels, an analog to digital converter (ADC) to convert the received RF signal into a digital signal, and the like. In the depicted embodiment, WLAN module 202 is shown with a single antenna and a single receive/transmit chain, but more antennas and/or more chains may be employed as desired, such as in a multiple input, multiple output (MIMO) system. Further, one or more antennas employed by WLAN module 202 may be shared with other wireless communications protocols.

Wireless communications device 102 may also include host CPU 212 configured to perform the various computations and operations involved with the functioning of wireless communications device 102. As shown, host CPU 212 is coupled to WLAN module 202 through bus 214, which may be implemented as a peripheral component interconnect express (PCIe) bus, a universal serial bus (USB), a universal asynchronous receiver/transmitter (UART) serial bus, a suitable advanced microcontroller bus architecture (AMBA) interface, a serial digital input output (SDIO) bus, or other equivalent interface. In one embodiment, upper layers of the protocol stacks of the WLAN and supplementary systems may be implemented as software instructions stored in memory 216 that may be accessed by host CPU 212 over bus 214.

Wireless communications device 102 may include ATIM controller 218 implemented as software instructions stored in memory 216 as depicted for the embodiment shown in FIG. 2. ATIM controller 218 may be configured to transmit and receive messages to coordinate the exchange of buffered data and to transition wireless communications device 102 between active mode and power save mode. In other embodiments, ATIM controller 218 may be implemented as a dedicated hardware circuit coupled to MAC 204 and PHY layer 206, or as any suitable combination of software, firmware and hardware.

According to the techniques of this disclosure, wireless communications device 102, or other devices having equivalent enhanced ATIM coordination capabilities, may employ ATIM signaling mechanisms to communicate the existence of buffered data pending transmission among nodes in WLAN 100 in a manner that permits such device to spend relatively greater amounts of time in power save mode as opposed to active mode. As described above, the conventional ATIM process involves the transmission of an ATIM management frame from the station having buffered data that is pending transmission and the reception of that ATIM management frame by one or more stations identified as intended recipients of the buffered data during the ATIM window. For all devices having enhanced ATIM coordination, one device may be established as ATIM coordinator for a given ATIM window. The role of ATIM coordinator may be distributed among the enhanced ATIM coordination devices in any suitable manner, such as randomly or on a round-robin basis. In one embodiment, the role of ATIM coordinator may be assigned to device that is assigned the role of transmitting the beacon that initiates the given ATIM window.

In some embodiments, rather than directly exchanging ATIM management frames between nodes having buffered data for transmission and reception in the conventional manner, the ATIM coordinator serves as a centralized distribution point to receive indications of pending data from stations having buffered data to transmit and/or transmit indications of pending data to any intended recipients. Accordingly, a station having buffered data to transmit may awaken at the TBTT, inform the ATIM coordinator of the intended recipient stations during the ATIM window and return to power save mode for the remainder of the window. A station may also indicate multicast or broadcast data for a group of destination addresses to the ATIM coordinator. Any station not having buffered data to transmit may awaken only for the beacon and directly return to power save mode. All stations reawaken (or simply remain awake if they have not entered power save mode) at the end of the ATIM window to receive an ATIM Indication sent by the ATIM coordinator that identifies all stations for which data is pending. This allows any stations either transmitting or receiving buffered data to remain awake for the current beacon interval to exchange the buffered data. This also allows any station not transmitting or receiving buffered data to enter power save mode until the next TBTT.

Each station may inform the ATIM coordinator of any destination addresses for which they have buffered data using an ATIM Request frame. The ATIM coordinator collects all addresses for the stations that are to receive buffered data, including any destination addresses associated with data that is buffered by the ATIM coordinator. At the end of the ATIM window, the ATIM coordinator broadcasts an ATIM Indication frame containing all the collected addresses. Any station having pending data to transmit and any station identified as being a destination for buffered data may then remain awake to perform the exchange. In one embodiment, a destination station may poll the source station to initiate the transmission by sending an ATIM Response frame. Correspondingly, upon receipt of the ATIM Response frame, the source station may then transmit the buffered data to the destination station. Multicast or broadcast pending data may be transmitted after the ATIM window without an explicit response.

In one embodiment, the buffered data at a source station may include a null data frame configured to signal a change in power management mode of the source station. The destinations of such null data frames may be included by the ATIM coordinator in the ATIM Indication frame. Unicast null data frames may be acknowledged by the destination station using the ATIM Response frame described above. Multicast null data frames may not be explicitly acknowledged, so the source station may be configured to transmit the multicast null data frames a predetermined number of times before changing power management state to increase the likelihood of the destination stations receiving the frames.

Figure 3:
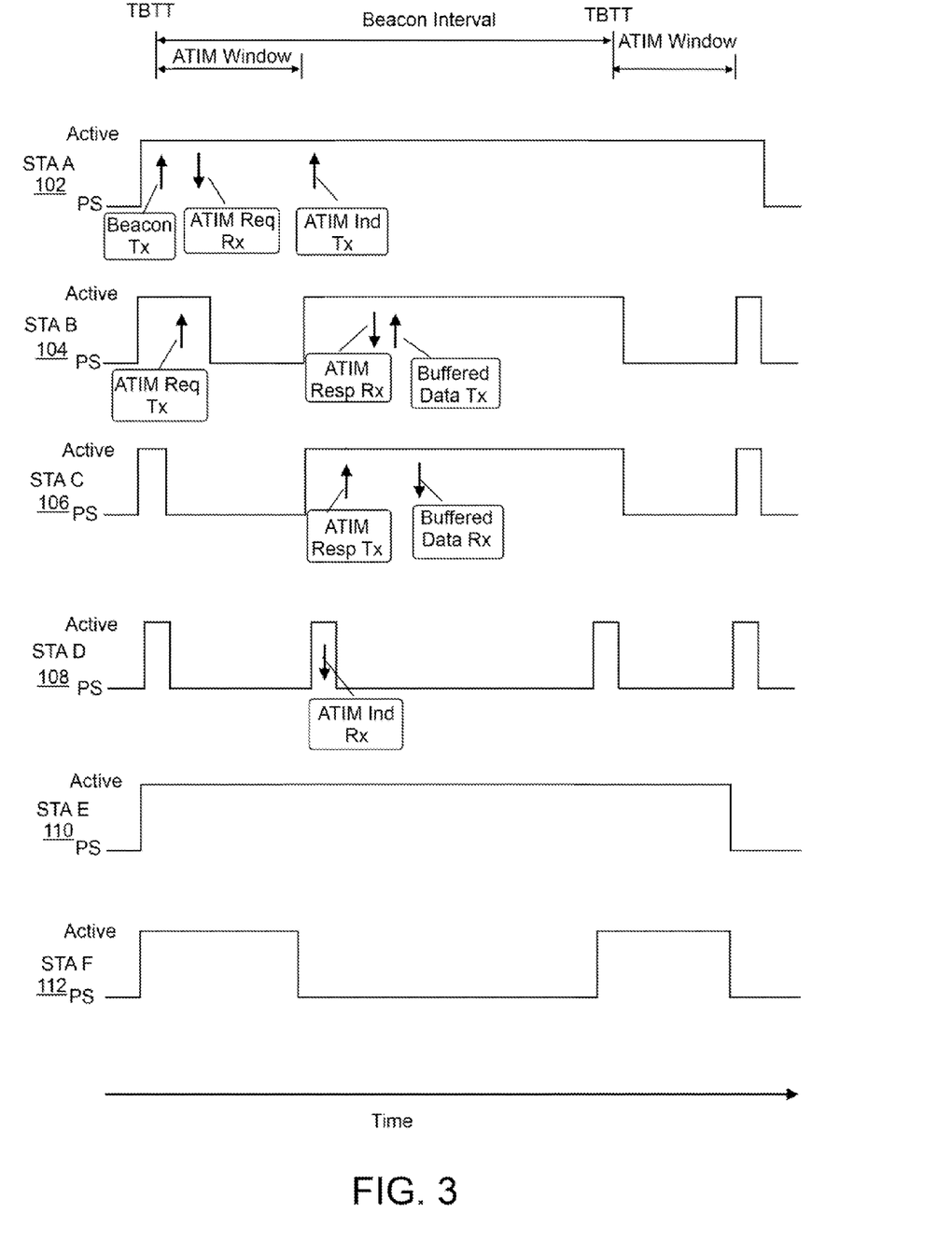
FIG. 3 represents a timing diagram comparing operation of enhanced ATIM coordination stations and conventional stations in power save mode and active mode, according to one embodiment.

An example of enhanced ATIM coordination is represented by the timing diagram of FIG. 3 that illustrates coordination of stations in WLAN 100. In this embodiment, STA A 102, STA B 104, STA C 106 and STA D 108 are configured to operate according to the techniques of this disclosure, while STA E 110 represents a conventionally configured station having buffered data to receive or transmit and STA F 112 represents a conventionally configured station having no buffered data to receive or transmit.

In this example, STA A 102 transmits the beacon for the depicted beacon interval that begins with ATIM window 302 and may therefore be configured to operate as the ATIM coordinator. As shown, STA A awakens prior to the TBTT in order to transmit the beacon (Beacon Tx) and remains awake for the current beacon interval. Notably, under the conventional ATIM process, the station transmitting the beacon also remains awake for the same period, so no additional period of activity is required to implement the techniques of this disclosure. For the purposes of this example, STA B 104 is a source station having buffered data for a destination station, STA C 106. As described above, STA B transmits an ATIM Request frame (ATIM Req Tx) to the ATIM coordinator, STA A 102 during ATIM window 302, identifying STA C 106 as a destination station for buffered data in the current beacon interval. STA B 104 may enter power save mode once STA A 102 acknowledges reception of the ATIM Request frame, such as by acknowledging the ATIM Request reception (ATIM Req Rx). Stations that are only destinations of buffered data, such as STA C 106, or stations that have no buffered data to receive or transmit, such as STA D 108, may return to power save mode after receiving the beacon, since there is no need to inform the ATIM coordinator of buffered data pending transmission with respect to these stations.

In some embodiments, all stations return to active mode at the end of ATIM window 302 to receive the ATIM Indication frame (ATIM Ind Tx) sent by the ATIM coordinator, STA A 102. In this example, the ATIM Indication frame identifies STA B 104 as a source station and STA C 106 as a destination station. (Receipt of the ATIM Indication frame by STA B 104 and STA C 106 not shown for clarity). Accordingly, upon receipt of the ATIM Indication, STA C 106 may then transmit an ATIM Response frame to STA B (ATIM Resp Tx) to initiate the transfer of the buffered data. Upon receipt of the ATIM Response transmission (ATIM Resp Rx), STA B 104 may then transmit buffered data (Buffered Data Tx) for reception by STA C 106 (Buffered Data Rx). Since STA D 108 is neither a source or destination station for the current beacon interval, it may return to power save mode after receiving the ATIM Indication (ATIM Ind Rx) as indicated.

For comparison, the conventional operation of STA E 110 requires it to remain in active mode for the entire beacon interval and at least the subsequent ATIM window. In contrast, STA B 104 and STA C 106 may each spend a portion of ATIM window 302 in power save mode. Likewise, the conventional operation of STA F 112 requires it to be in active mode for the duration of each ATIM window even when it has no buffered data to receive or transmit. On the other hand, STA D 108, which also has no buffered data to receive or transmit, may only be in active mode to receive the beacon frame and the ATIM Indication frame, but may spend the remainder of the ATIM window in power save mode. Accordingly, these techniques coordinate the exchange of buffered data while allowing greater periods of time to be spent in power save mode.

In this example, STA B 104 transmits the beacon frame associated with the subsequent ATIM window, ATIM window 304. As shown, STA B 104 is already awake at the TBTT but if not, would return to active mode to transmit the beacon (Beacon Tx) and to receive any ATIM Request frames during ATIM window 304. STA A 102, STA C 106 and STA D 108 are each shown in active mode to receive the beacon frame transmitted at the start of ATIM window 304. Again, for the purposes of this example only, none of these stations have buffered data for transmission and return to power save mode without sending ATIM Request frames. Similarly, each station also awakens at the end of ATIM window 304 to receive the ATIM Indication frame (ATIM Ind Tx) sent by STA B 104. Since no destination stations were identified in ATIM window 304 (i.e., no stations had buffered data for transmission such that no ATIM Request frames were sent), STA A 102, STA C 106 and STA D 108 are shown as entering power save mode after receiving the ATIM Indication frame (ATIM Ind Rx).

As described above, responsibility for broadcasting the beacon frame as well as performing the role of ATIM coordinator may be distributed among the stations participating in the IBSS as desired, such that another station may broadcast the beacon frame and/or receive ATIM Requests during subsequent ATIM windows. A given station may also function as ATIM coordinator for a desired number of consecutive beacon intervals before handing off the management responsibilities.

Figure 4:
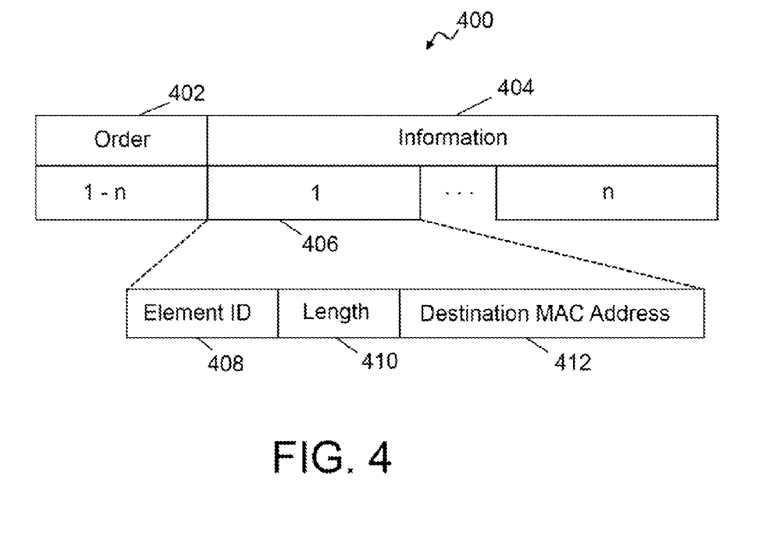
FIG. 4 schematically depicts an ATIM Request frame, according to one embodiment.

Exchange of information between enhanced ATIM coordination stations may be carried out in any suitable manner. As described above, source stations having buffered pending data for destination stations may communicate identification information regarding the involved stations through use of an ATIM Request management frame. One example of a suitable format for an ATIM Request management frame is shown in FIG. 4. ATIM Request frame 400 may include an order field 402, identifying one or more pending data transactions for a given source station. As such, order field 402 may specify a number from 1 to n of pending transmissions, such as one for each destination station for which the source station has data buffered for transmission. Information field 404 may be a concatenation of 1 to n pending traffic request elements, such as pending traffic request element 406. In one example, as shown, each element may include an element identification (Element ID) field 408, which may be one octet, length field 410, which may be one octet, and address field 412, which may be six octets specifying the MAC address of the destination station.

Since the ATIM Response frame functions to initiate the transfer of pending data buffered for transmission from the source station to the destination station, it may be a null frame sent from the destination station to the source station.

Figure 5:
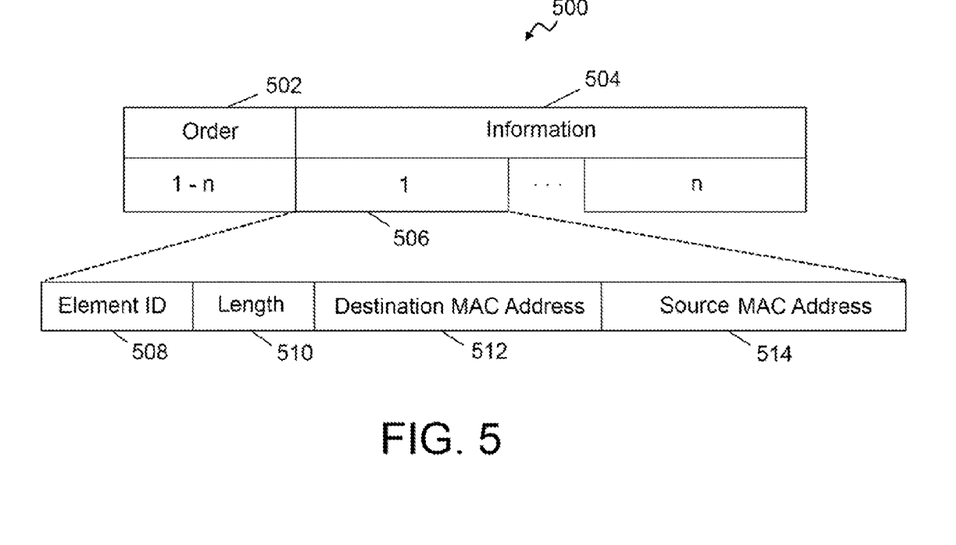
FIG. 5 schematically depicts an ATIM Indication frame, according to one embodiment.

As described above, the ATIM coordinator may notify any destination stations of the existence of data buffered for transmission at source stations through the use of an ATIM Indication frame. One example of a suitable format for an ATIM Indication management frame is shown in FIG. 5. ATIM Indication frame 500 may include an order field 502, identifying zero or more pending data transactions for each combination of source station and destination station, depending upon the ATIM Request frames received during the current ATIM window. As such, order field 502 may specify a number from 1 to n of pending transmissions. Information field 504 in turn may be a concatenation of 1 to n pending traffic indication elements, such as pending traffic indication element 506. In one example, as shown, each element may include an element identification (Element ID) field 508, which may be one octet, length field 510, which may be one octet, destination address field 512, which may be six octets specifying the MAC address of the destination station and source address field 514, which may be six octets specifying the MAC address of the source station.

Figure 6:
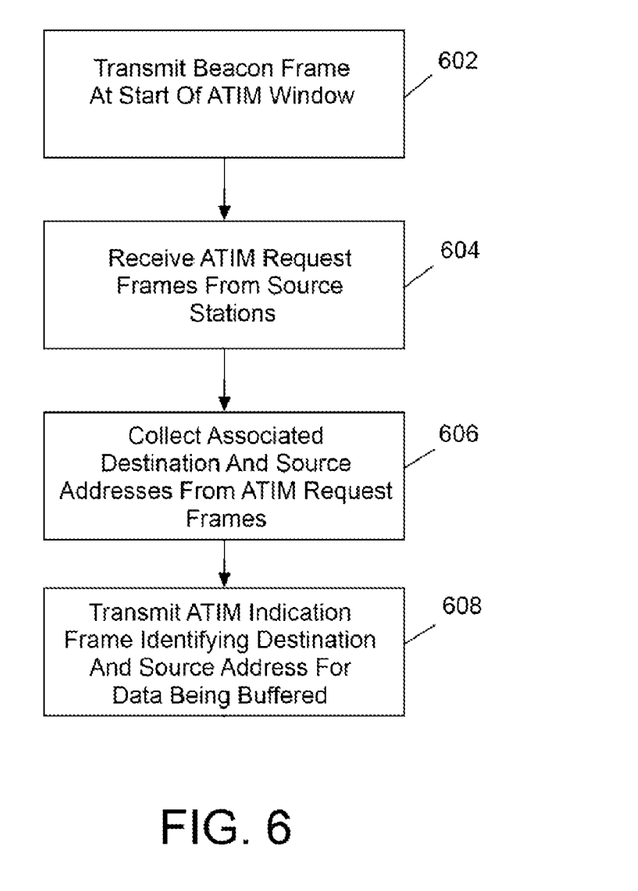
FIG. 6 is a flowchart showing an exemplary routine for operating an ATIM coordinator, according to one embodiment.

To help illustrate aspects of the enhanced ATIM coordination described above, FIG. 6 represents a flowchart showing one exemplary routine of the disclosure in the context of the ATIM coordinator. Beginning with 602, a station operating in the ATIM coordinator role, such as STA A 102 in the examples described above, may transmit a beacon, initiating an ATIM window. During the ATIM window, the ATIM coordinator may receive zero or more ATIM Request frames in 604 sent by any source stations within WLAN 100 having data buffered for transmission. In 606, ATIM coordinator may collect pairs of source and destination addresses for stations associated with the buffered data. Next, in 608, ATIM coordinator may transmit an ATIM Indication frame after the ATIM window lapses, alerting any identified destination stations to remain awake and to poll the associated source stations to initiate transfer of the buffered data.

Figure 7:
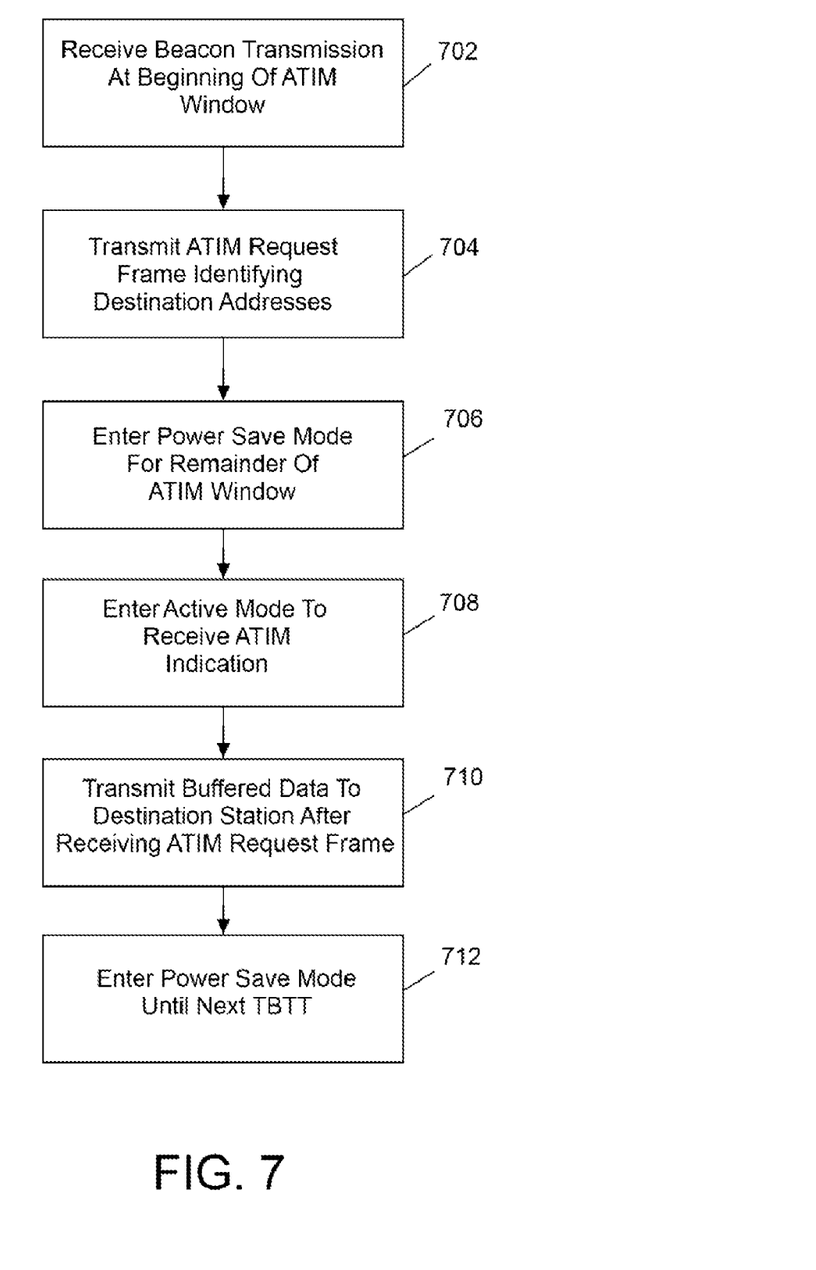
FIG. 7 is a flowchart showing an exemplary routine for operating a source station, according to one embodiment.

For example, FIG. 7 represents a flowchart showing one exemplary routine in the context of an enhanced ATIM coordination station having buffered data for transmission. Beginning with 702, the source station, such as STA B 104 in the examples described above, may receive a beacon transmission indicating the start of an ATIM window. In turn, the source station may send an ATIM Request frame to the ATIM coordinator identifying each destination station for which data is buffered in 704. The source station may then enter power save mode in 706 for the remainder of the ATIM window. When the ATIM window lapses, the source station may return to active mode to receive the ATIM Indication frame in 708, by which the ATIM coordinator communicates the availability of the buffered data to the destination stations. The source station may remain in active mode until receiving an ATIM Response frame from the destination stations, such as STA C 106 in the examples described above, when the source station may transfer the buffered data in 710. If the buffered data is transmitted prior to the end of the current beacon interval, the source station may return to power save mode until the next TBTT in 712.

Figure 8:
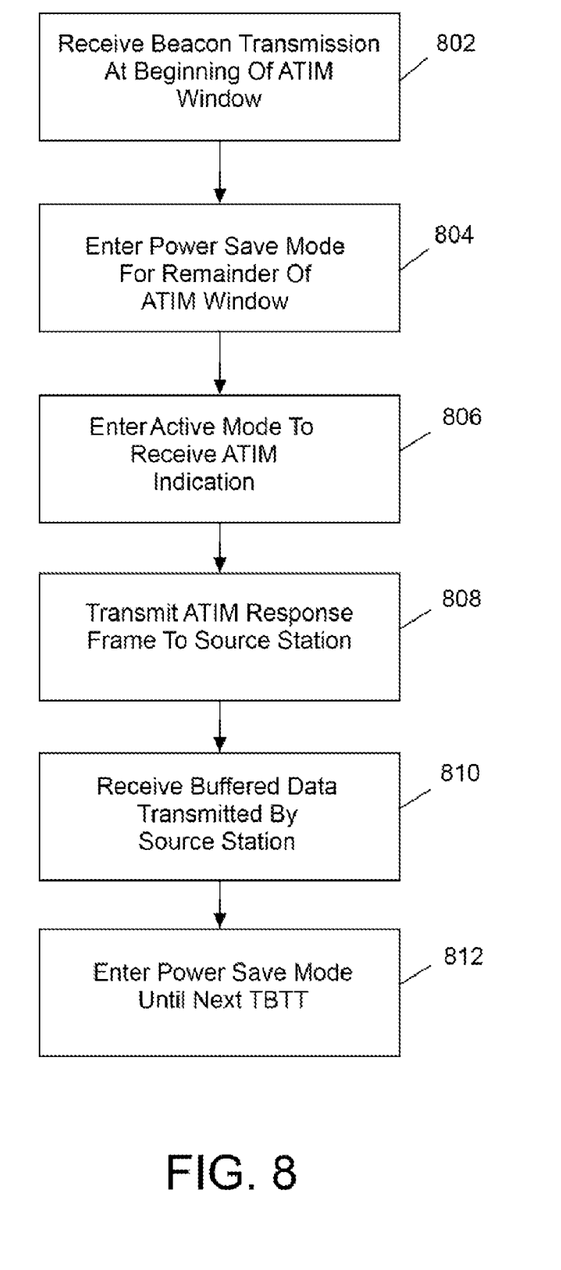
FIG. 8 is a flowchart showing an exemplary routine for operating a destination station, according to one embodiment.

Correspondingly, FIG. 8 represents a flowchart showing one exemplary routine in the context of an enhanced ATIM coordination station for which data is being buffered. Beginning with 802, the destination station, such as STA C 106 in the examples described above, may awaken to receive the beacon that initiates the current ATIM window. If the destination station has no buffered data pending for other stations, it may enter power save mode in 804 after receiving the beacon. The destination station may return to active mode at the end of the ATIM window to receive the ATIM Indication frame sent by the ATIM coordinator in 806, alerting the destination station that data is buffered at the source station. Correspondingly, the destination station may send an ATIM Response frame to the identified source station in 808. Transmission of the ATIM Response frame from the destination station may then initiate transfer of the buffered data from the source station in 810. Similarly, if the buffered data is transmitted prior to the end of the current beacon interval, the destination station may also return to power save mode until the next TBTT in 812.

Figure 9:
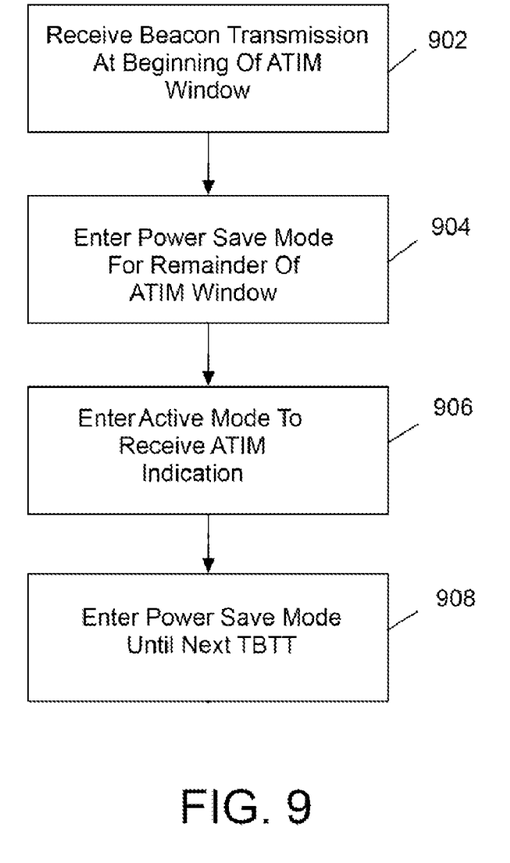
FIG. 9 is a flowchart showing an exemplary routine for operating a station not exchanging information during a given interval, according to one embodiment.

In another aspect, FIG. 9 represents a flowchart showing one exemplary routine in the context of an enhanced ATIM coordination station that neither receives nor transmits buffered data during a given beacon interval. Beginning with 902, a station such as STA D 108 in the examples described above, may awaken to receive the beacon that initiates the current ATIM window. In this embodiment, STA D 108 has no buffered data pending for other stations and correspondingly may enter power save mode in 904 after receiving the beacon. STA D 108 may return to active mode at the end of the ATIM window to receive the ATIM Indication frame sent by the ATIM coordinator in 906, learning that no other stations in the IBSS have buffered data pending delivery to STA D 108. Accordingly, STA D 108 may then return to power save mode until the next TBTT in 908.

Described herein are presently preferred embodiments. However, one skilled in the art will understand that the principles of this disclosure can be extended easily with appropriate modifications to other applications.

What is claimed is:

1. A method for operating a station in an independent basic service set (IBSS) for a plurality of stations, comprising:
receiving at a first station a beacon frame broadcast by an announcement traffic indication message (ATIM) coordinator at a beginning of an ATIM window, wherein the ATIM coordinator is a station within the IBSS;
operating the first station in a power save mode for a period of time after receiving the beacon frame;
operating the first station in an active mode after an end of the ATIM window; and
receiving at the first station an ATIM Indication frame transmitted by the ATIM coordinator after the end of the ATIM window.

2. The method of claim 1, further comprising transmitting an ATIM Request frame from the first station when the first station is a source station having buffered data pending transmission for a destination station within the IBSS, wherein the ATIM Request frame is transmitted after the first station has received the beacon frame and before operating the first station in the power save mode and wherein the ATIM Request frame has location information identifying the destination station.

3. The method of claim 2, further comprising operating the first station in an active mode after receiving the ATIM Indication frame and transmitting the buffered data to the destination station.

4. The method of claim 3, wherein the first station transmits the buffered data to the destination station after receiving an ATIM Response frame transmitted by the destination station.

5. The method of claim 1, further comprising operating the first station in an active mode after receiving the ATIM Indication frame when the first station is identified as a destination station by the ATIM Indication frame.

6. The method of claim 5, further comprising transmitting an ATIM Response frame by the first station to a source station identified by the ATIM Indication frame to initiate transfer of buffered data pending transmission from the source station to the first station.

7. The method of claim 1, further comprising operating the first station in the power save mode for a current beacon interval after receiving the ATIM Indication frame when the ATIM Indication frame does not identify the first station as a destination station for buffered data pending transmission.

8. A wireless communications device for use in an independent basic service set (IBSS) with a plurality of stations, comprising a transceiver and an announcement traffic indication message (ATIM) controller, wherein the transceiver to:
receive a beacon frame broadcast by an announcement traffic indication message (ATIM) coordinator at a beginning of an ATIM window, wherein the ATIM coordinator is a station within the IBSS; and
receive an ATIM Indication frame transmitted by the ATIM coordinator after an end of the ATIM window;
and wherein the ATIM controller to:
operate the wireless communications device in a power save mode for a period of time after receiving the beacon frame; and
operate the wireless communications device in an active mode after the end of the ATIM window.

9. The wireless communications device of claim 8, wherein the ATIM controller further to provide location information to the transceiver for a destination station within the IBSS when the wireless communications device is a source station having buffered data pending transmission for the destination station; and wherein the transceiver further to transmit an ATIM Request frame having the location information after the wireless communications device has received the beacon frame and before the wireless communications device is operated in the power save mode.

10. The wireless communications device of claim 9, wherein the ATIM controller further to operate the first station in an active mode after the transceiver receives the ATIM Indication frame and wherein the transceiver further to transmit the buffered data to the destination station.

11. The wireless communications device of claim 10, wherein the transceiver to transmit the buffered data to the destination station after receiving an ATIM Response frame transmitted by the destination station.

12. The wireless communications device of claim 8, wherein the ATIM controller further to operate the wireless communications device in an active mode after the transceiver receives the ATIM Indication frame when the wireless communications device is identified as a destination station by the ATIM Indication frame.

13. The wireless communications device of claim 12, wherein the transceiver further to transmit an ATIM Response frame to a source station identified by the ATIM Indication frame to initiate transfer of buffered data pending transmission from the source station.

14. The wireless communications device of claim 8, wherein the ATIM controller further to operate the wireless communications device in the power save mode for a current beacon interval after the transceiver receives the ATIM Indication frame when the ATIM Indication frame does not identify the wireless communications device as a destination station for buffered data pending transmission.

15. A non-transitory processor-readable storage medium for operating a wireless communications device in an independent basic service set (IBSS) with a plurality of stations, the processor-readable storage medium having instructions thereon, when executed by a processor to cause the wireless communications device to:
  operate in a power save mode for a period of time after receiving a beacon frame broadcast by an announcement traffic indication message (ATIM) coordinator at a beginning of an ATIM window, wherein the ATIM coordinator is a station within the IBSS; and
  operate in an active mode after an end of the ATIM window to receive an ATIM Indication frame transmitted by the ATIM coordinator after the end of the ATIM window.

16. The non-transitory processor-readable storage medium of claim 15, further comprising instructions to transmit an ATIM Request frame when the wireless communications device is a source station having buffered data pending transmission for a destination station within the IBSS, wherein the ATIM Request frame is transmitted after receiving the beacon frame and before operating in the power save mode and wherein the ATIM Request frame has location information identifying the destination station.

17. The non-transitory processor-readable storage medium of claim 16, further comprising instructions to operate in an active mode after receiving the ATIM Indication frame and to transmit the buffered data to the destination station.

18. The non-transitory processor-readable storage medium of claim 17, wherein the instructions to transmit the buffered data to the destination station comprise instructions to transmit the buffered data after receiving an ATIM Response frame transmitted by the destination station.

19. The non-transitory processor-readable storage medium of claim 15, further comprising instructions to operate in an active mode after receiving the ATIM Indication frame when the wireless communications device is identified as a destination station by the ATIM Indication frame.

20. The non-transitory processor-readable storage medium of claim 19, further comprising instructions to transmit an ATIM Response frame to a source station identified by the ATIM Indication frame to initiate transfer of buffered data pending transmission from the source station to the wireless communications device.

21. The non-transitory processor-readable storage medium of claim 15, further comprising instruction to operate in the power save mode for a current beacon interval after receiving the ATIM Indication frame when the ATIM Indication frame does not identify the first station as a destination station for buffered data pending transmission.

* * * * *